(12) United States Patent
Kim

(10) Patent No.: US 11,518,345 B2
(45) Date of Patent: Dec. 6, 2022

(54) VEHICLE AND METHOD OF CONTROLLING THE SAME

(71) Applicants: Hyundai Motor Company, Seoul (KR); Kia Corporation, Seoul (KR)

(72) Inventor: Singu Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/475,971

(22) Filed: Sep. 15, 2021

(65) Prior Publication Data

US 2022/0203935 A1 Jun. 30, 2022

(30) Foreign Application Priority Data

Dec. 24, 2020 (KR) .................. 10-2020-0183276

(51) Int. Cl.
| | |
|---|---|
| *B60R 25/30* | (2013.01) |
| *G06K 9/00* | (2022.01) |
| *B60R 25/104* | (2013.01) |
| *B60R 25/01* | (2013.01) |
| *B60R 25/31* | (2013.01) |
| *B60R 25/33* | (2013.01) |
| *G06V 40/20* | (2022.01) |

(52) U.S. Cl.
CPC ............ B60R 25/305 (2013.01); B60R 25/01 (2013.01); B60R 25/104 (2013.01); B60R 25/31 (2013.01); B60R 25/33 (2013.01); G06V 40/20 (2022.01); *B60R 2325/10* (2013.01)

(58) Field of Classification Search
CPC ..... B60R 25/305; B60R 25/01; B60R 25/104; B60R 25/31; B60R 25/33; B60R 2325/10; G06V 40/20
See application file for complete search history.

(56) References Cited

U.S. PATENT DOCUMENTS

| | | | | |
|---|---|---|---|---|
| 9,327,685 | B1* | 5/2016 | Wooten | B60R 25/102 |
| 10,293,664 | B2* | 5/2019 | Gao | B60H 1/00978 |
| 11,021,133 | B2* | 6/2021 | Lu | H04N 7/188 |
| 2007/0115099 | A1* | 5/2007 | Hamada | B60R 11/04 |
| | | | | 348/151 |
| 2011/0145041 | A1* | 6/2011 | Salamatov | G06Q 20/10 |
| | | | | 705/26.1 |
| 2018/0056940 | A1* | 3/2018 | Etonye | B60R 25/305 |
| 2018/0072269 | A1* | 3/2018 | Tong | B60R 25/305 |
| 2018/0201227 | A1* | 7/2018 | Gao | B60R 25/305 |

* cited by examiner

*Primary Examiner* — Thomas D Alunkal
(74) *Attorney, Agent, or Firm* — Slater Matsil, LLP

(57) ABSTRACT

An embodiment vehicle includes at least one first camera, a communicator, and a controller connected to the at least one first camera and the communicator. The controller is configured to identify an ignition-off state of the vehicle, acquire at least one first image through the at least one first camera based on the ignition-off state of the vehicle, identify a possibility of occurrence of a security-related dangerous situation of the vehicle based on the acquired at least one first image, and in response to the identifying on the possibility of occurrence of the security-related dangerous situation of the vehicle, and transmit information on the possibility of occurrence of the security-related dangerous situation of the vehicle to at least one external device through the communicator.

16 Claims, 7 Drawing Sheets

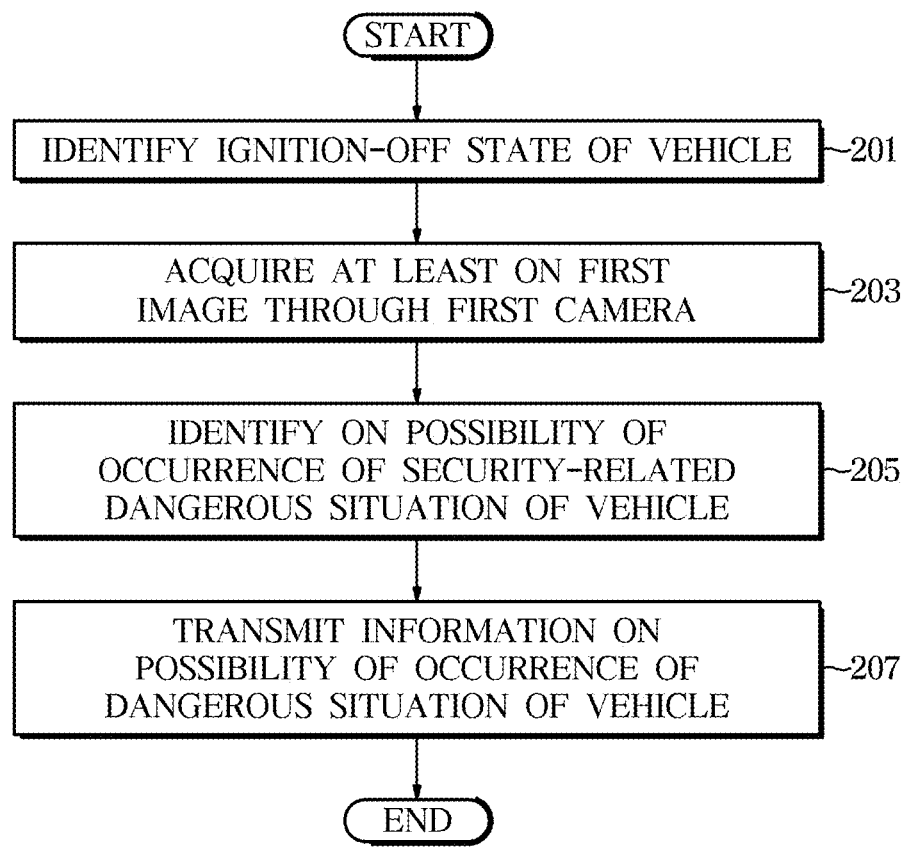

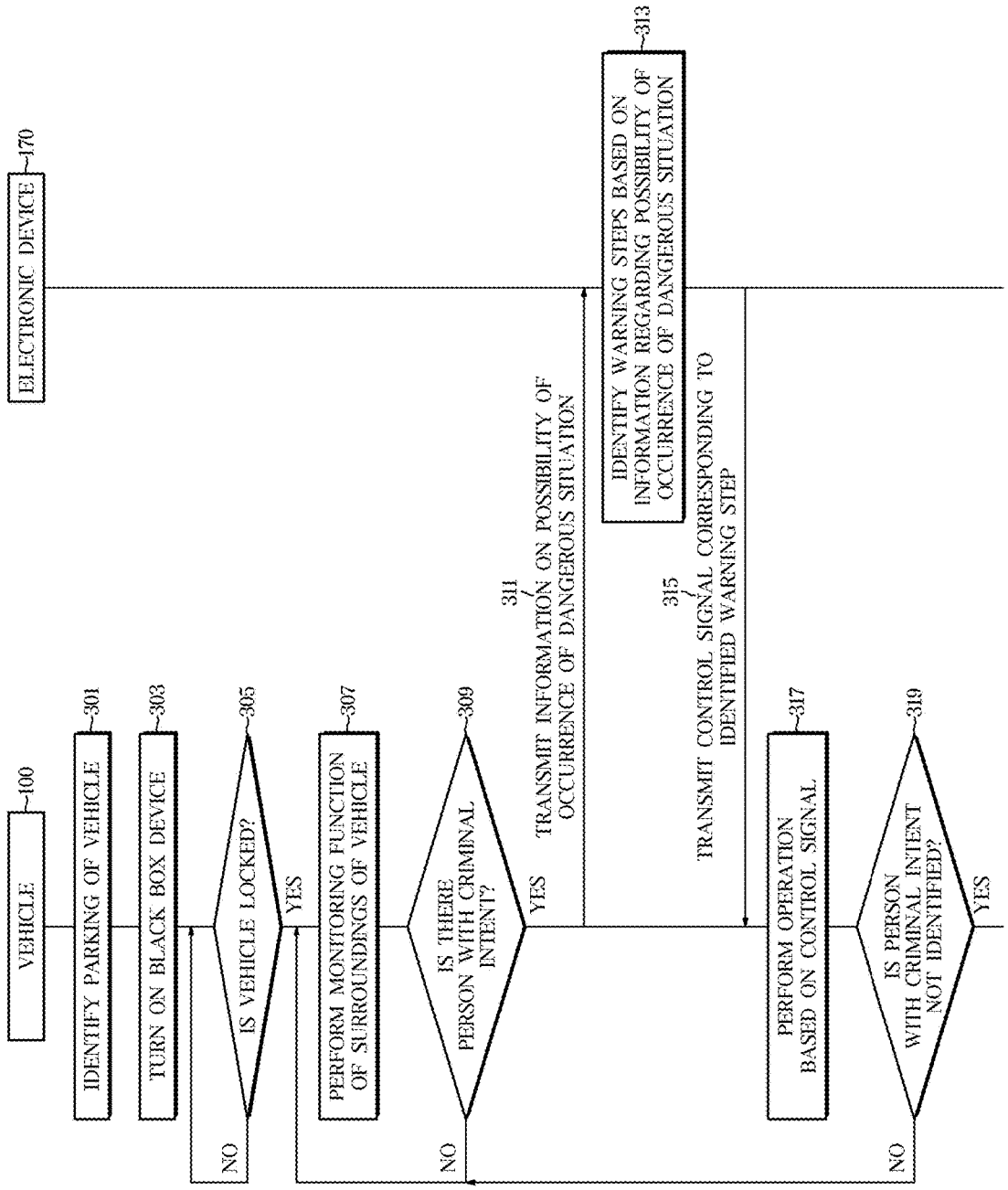

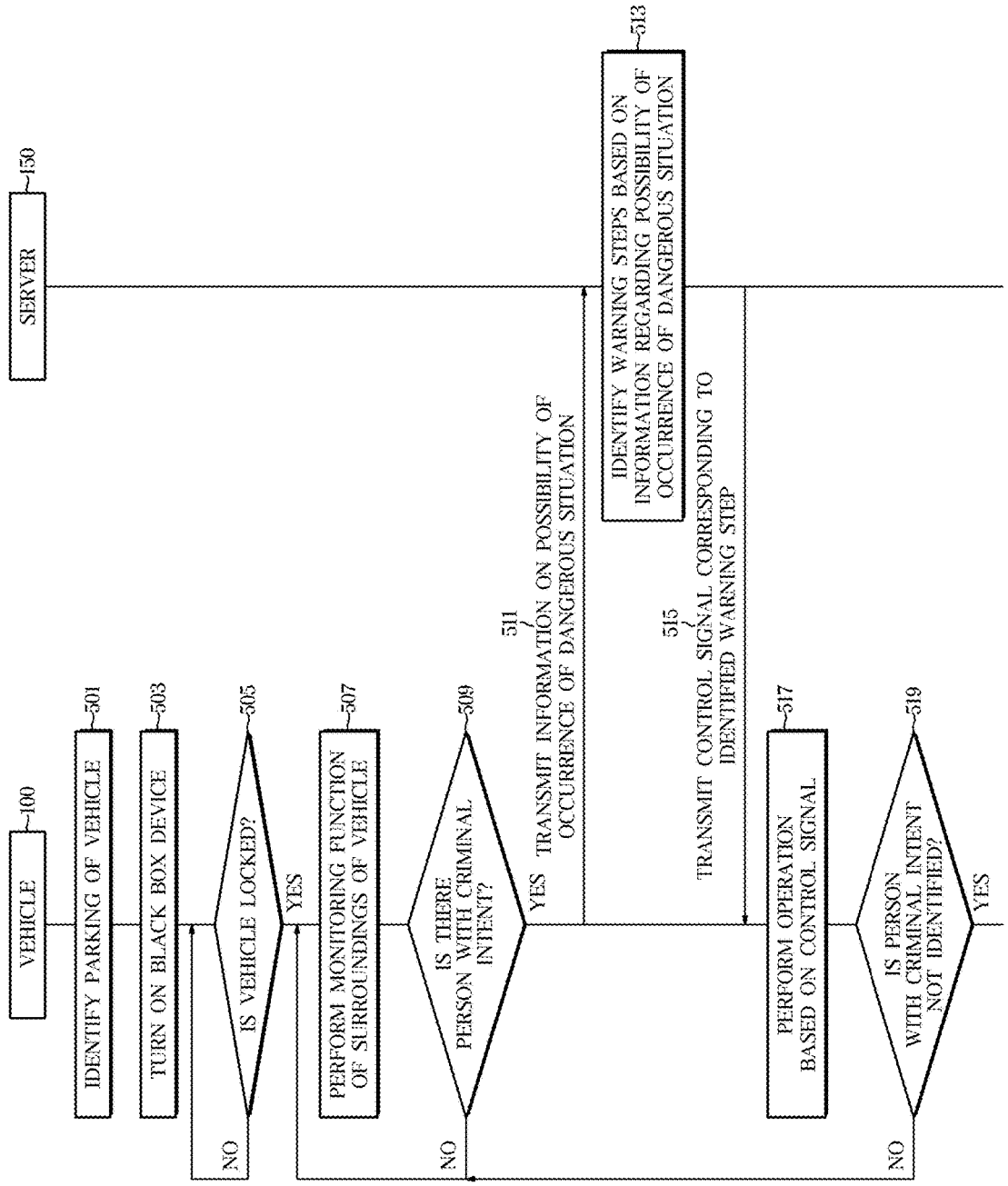

VEHICLE AND METHOD OF CONTROLLING THE SAME

CROSS-REFERENCE TO RELATED APPLICATIONS

This application claims the benefit of Korean Patent Application No. 10-2020-0183276, filed on Dec. 24, 2020, in the Korean Intellectual Property Office, the disclosure of which is hereby incorporated herein by reference in its entirety.

TECHNICAL FIELD

The present disclosure relates to a vehicle and a method of controlling the same.

BACKGROUND

Generally, a built-in cam and a digital key system are commonly applied in vehicles. The built-in cam is a built-in black box installed behind a vehicle's rearview mirror, and is a kind of drive video record system (DVRS). The digital key system is a system that provides a service that allows electronic devices and/or a card key to control a vehicle, such as opening a vehicle door and starting the vehicle, instead of a conventional automobile key.

Such vehicle technologies are technologies for providing not only user convenience but also vehicle security. For example, when items in the vehicle are stolen and/or the vehicle is damaged, a built-in cam may be usefully used to search a criminal. In addition, a digital key system may prevent a vehicle theft by allowing only an authenticated user to use the vehicle.

However, such conventional technologies for vehicle security are technologies for follow-up measures after an accident or incident occurs.

Technologies for preventing vehicle theft, theft of items in the vehicle, and/or damage to the vehicle in advance has not been developed.

SUMMARY

Therefore, it is an aspect of the present disclosure to provide a vehicle capable of providing a security technology that executes an alert mode after identify a person approaching the vehicle with malicious intent, and a method of controlling the same.

For example, the vehicle automatically set the alert mode of the vehicle, identify the person approaching the vehicle with malicious intent thereafter, thereby storing a danger image, providing a danger alarm to the user of the vehicle and/or a warning to persons approaching the vehicle, a control method thereof.

Additional aspects of the disclosure will be set forth in part in the description which follows and, in part, will be obvious from the description, or may be learned by practice of the disclosure.

In accordance with an aspect of the present disclosure, a vehicle includes at least one first camera; a communicator; and a controller connected to the at least one first camera and the communicator; wherein the controller is configured to identify an ignition-off state of the vehicle, acquire at least one first image through the at least one first camera based on the ignition-off state of the vehicle, identify a possibility of occurrence of a security-related dangerous situation of the vehicle based on the acquired at least one first image, and in response to the identifying on the possibility of occurrence of the security-related dangerous situation of the vehicle, transmit information on the possibility of occurrence of the security-related dangerous situation of the vehicle to at least one external device through the communicator.

The controller may be configured to identify a presence of the person with criminal intent in a vicinity of the vehicle based on the at least one first image, and in response to the identifying the presence of the person with criminal intent in the vicinity of the vehicle, identify the possibility of occurrence of the security-related dangerous situation of the vehicle.

The at least one first image may include a Vibraimage, and the controller is configured to identify the presence of the person with the criminal intent in the vicinity of the vehicle in response to an analysis of the Vibraimage based on a Vibraimage technology.

The vehicle may further include at least one second camera, wherein the controller is configured to turn on the at least one second camera in response to identifying the presence of the person with criminal intent in the vicinity of the vehicle, and identify the possibility of occurrence of the security-related dangerous situation of the vehicle based on at least one second image acquired through the at least one second camera.

The vehicle may further include an ultra-wide band (UWB) wireless communication module, wherein the controller is configured to turn on the UWB wireless communication module in response to identifying the presence of the person with the criminal intent in the vicinity of the vehicle, and identify the possibility of occurrence of the security-related dangerous situation of the vehicle based on a signal received via the UWB wireless communication module.

The controller may be configured to identify eliminating of the possibility of occurrence of the dangerous situation through the at least one first camera and the at least one second camera, and in response to identifying the eliminating of the possibility of occurrence of the dangerous situation, turn off the at least one second camera and the UWB wireless communication module.

The vehicle may further include a global positioning system (GPS) module, wherein the controller is configured to identify a parking position of the vehicle based on a signal received through the GPS module when the vehicle is parked, and turn on or turn off the at least one second camera at a predetermined time interval based on the parking position of the vehicle.

The vehicle may further include a memory, wherein the controller is configured to identify whether the parked location of the vehicle is included in a hazardous area based on at least one of hazardous area information received through the communicator and hazardous area information stored in the memory, and in response to the identifying whether the parked location of the vehicle is included in the hazardous area, turn on or turn off the at least one second camera at the predetermined time interval.

The controller may be configured to turn on or turn off the at least one second camera at the predetermined time interval further based on predetermined time information, The controller may be configured to receive a signal for controlling the turn on or turn off of the at least one second camera through the communicator, and control the turn on or turn off of the at least one second camera based on the signal for controlling the turn on or turn off of the at least one second camera.

The controller may be configured to identify a dangerous situation step in which a dangerous situation of the vehicle is included among predetermined dangerous situation steps, and Transmit information on the possibility of occurrence of the dangerous situation in response to the identified dangerous situation step.

The vehicle may further include a speaker, wherein the controller is configured to output predetermined warning data in response to the identified dangerous situation step through the speaker.

The vehicle may further include a speaker, wherein the controller is configured to output warning data through the speaker based on information received from the at least one external device through the communicator.

The at least one external device may include at least one of a digital key for controlling the vehicle and a server for managing security of the vehicle.

In accordance with another aspect of the present disclosure, a method of controlling a vehicle includes identifying, by a controller, an ignition-off state of the vehicle, acquiring, by the controller, at least one first image through at least one first camera based on the ignition-off state of the vehicle, identifying, by the controller, a possibility of occurrence of a security-related dangerous situation of the vehicle based on the acquired at least one first image, and transmitting, by the controller, information on the possibility of occurrence of the security-related dangerous situation of the vehicle to at least one external device in response to the identifying on the possibility of occurrence of the security-related dangerous situation of the vehicle.

The method may further include identifying, by the controller, a presence of the person with criminal intent in a vicinity of the vehicle based on the at least one first image, wherein the identifying on the possibility of occurrence of the security-related dangerous situation of the vehicle is performed, by the controller, in response to the identifying the presence of the person with criminal intent in the vicinity of the vehicle.

The identifying on the possibility of occurrence of the security-related dangerous situation of the vehicle may further include turning on at least one second camera in response to identifying the presence of the person with criminal intent in the vicinity of the vehicle, and identifying, by the controller, the possibility of occurrence of the security-related dangerous situation of the vehicle based on at least one second image acquired through the at least one second camera.

The identifying on the possibility of occurrence of the security-related dangerous situation of the vehicle may further include turning on an ultra-wide band (UWB) wireless communication module in response to identifying the presence of the person with the criminal intent in the vicinity of the vehicle, and identifying, by the controller, the possibility of occurrence of the security-related dangerous situation of the vehicle based on a signal received via the UWB wireless communication module.

The method may further include identifying, by the controller, elimination of the possibility of occurrence of the dangerous situation through the at least one first camera and the at least one second camera, and turning off, by the controller, the at least one second camera and the UWB wireless communication module in response to identifying the elimination of the possibility of occurrence of the dangerous situation.

The method may further include identifying, by the controller, a parking position of the vehicle based on a signal received through a global positioning system (GPS) module when the vehicle is parked, and turning on or turning off, by the controller, the at least one second camera at a predetermined time interval based on the parking position of the vehicle.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 2 is a flowchart showing a control operation of a vehicle according to an exemplary embodiment;

FIG. 3 is a flowchart showing operations of a vehicle and an electronic device according to an exemplary embodiment;

FIG. 5 is a flowchart showing operations of a vehicle and a server according to an exemplary embodiment.

DETAILED DESCRIPTION OF ILLUSTRATIVE EMBODIMENTS

Figure 1A:
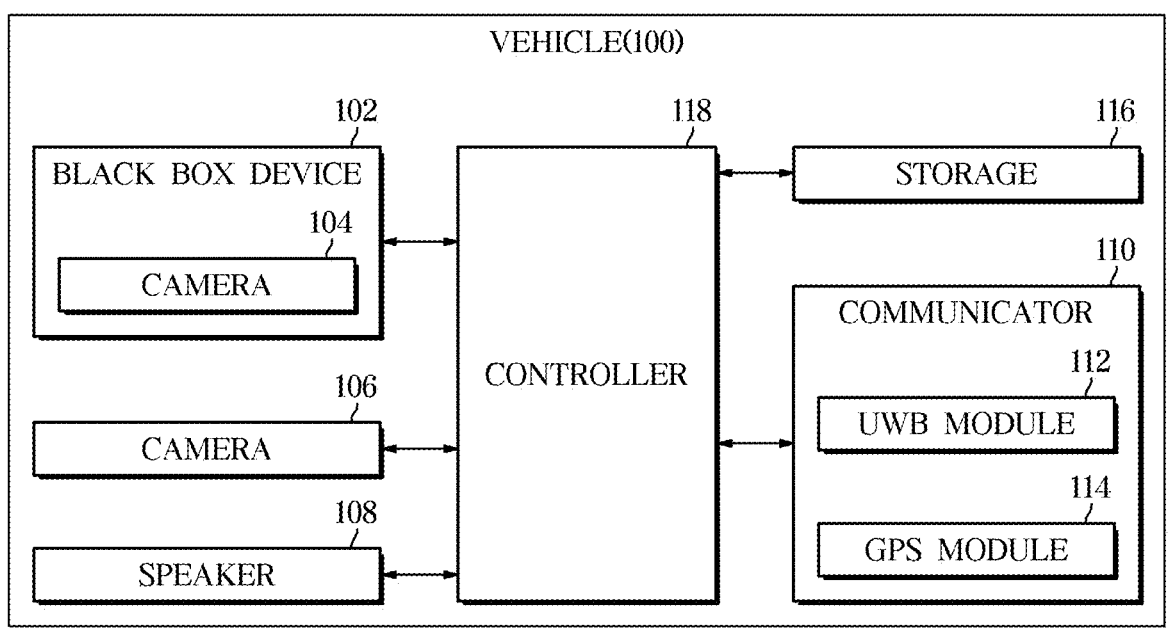
FIGS. 1A and 1B are views showing a vehicle, servers, and an electronic device according to an exemplary embodiment.

Reference will now be made in detail to the embodiments of the present disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 1B:
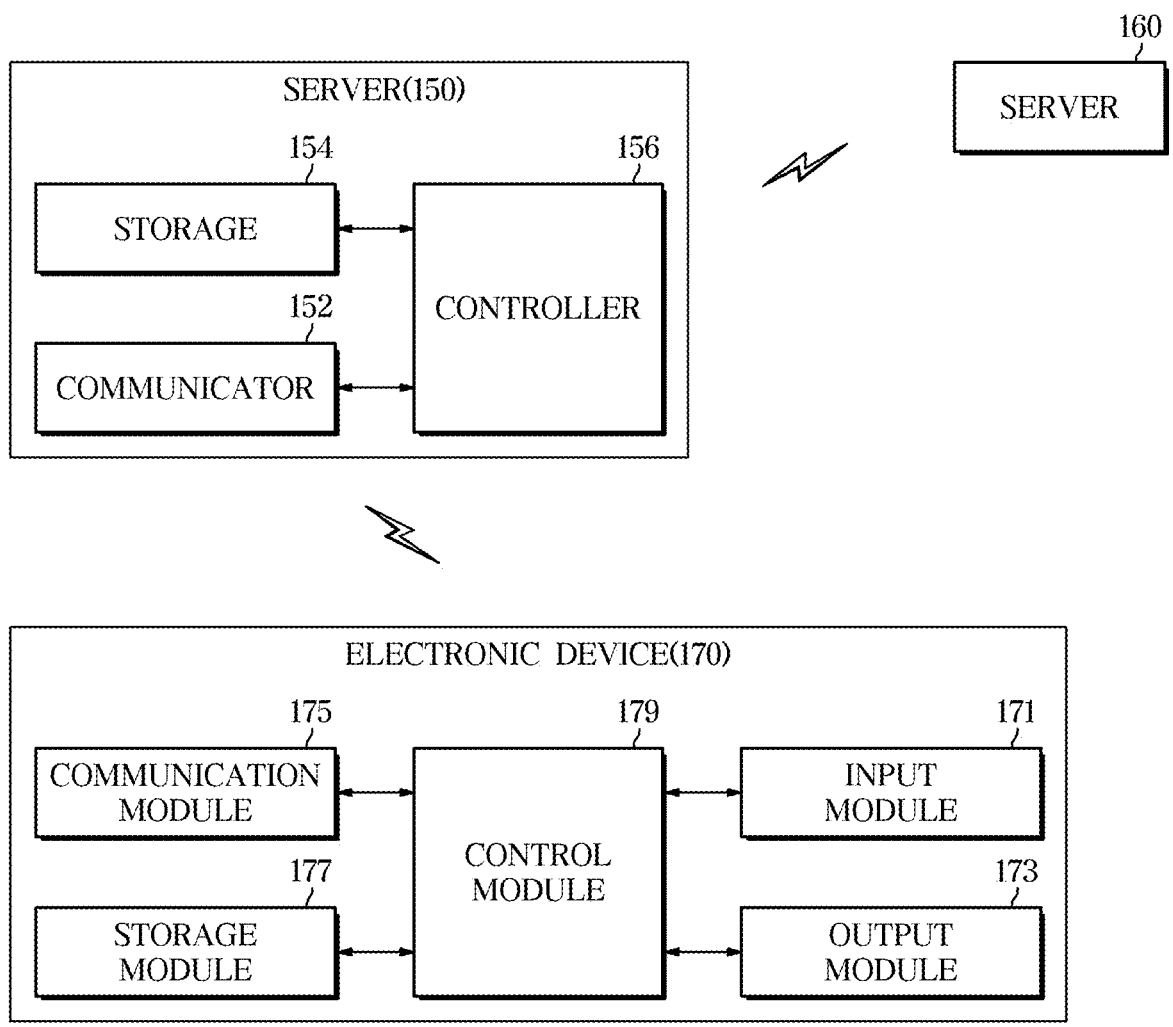

FIGS. 1A and 1B may include a vehicle 100, a server 150, a server 160, and an electronic device 170 according to an exemplary embodiment.

The vehicle 100 may include a black box device 102, a camera 106, a speaker 108, a communicator 110, a storage 116 and/or a controller 118.

The black box device 102 may record (or record and store) a surrounding image of the vehicle 100 when the vehicle 100 is driving, parked, and/or stopped. The black box device 102, when an impact of the vehicle 100 is detected, may operate to record images around the vehicle 100.

The black box device 102 may include a camera 104 (also referred to as a first camera).

The camera 104 may be one or plural, and may be mounted on a front, rear, left and/or right side of the vehicle 100 to acquire an image (also referred to as a video) around the vehicle 100. For example, the at least one camera 104 may acquire an image corresponding to a direction such as a front, a rear, and/or sides (a left direction and/or a right direction).

Furthermore, although not shown, the black box device 102 may further include a memory (not shown), and may store the image acquired through the camera 104 in the memory.

The black box device 102 may be implemented as a built-in type or a mounted type of the vehicle 100 For example, the black box device 102 may be located behind a rearview mirror (not shown) of the vehicle 100.

The camera 106 (also referred to as a second camera) may be one or plural, and may acquire an image of an interior of the vehicle 100 and/or an image of an exterior of the vehicle 100.

The camera 106 may be one or plural, and is mounted on the front, rear, left and/or right side of the vehicle 100 to acquire an image (also referred to as a video) around the vehicle 100 and/or the image of the interior image of the vehicle 100.

For example, although not shown, the vehicle 100 may include a surround view monitor (SVM) system (not shown), and the camera 106 may be included in the SVM system.

For example, the first camera 104 and/or the second camera 106 may include a device capable of acquiring a Vibraimage, and at least one of the first and/or second images may include the Vibraimage.

The speaker 108 may convert an electrical signal into sound to output.

The speaker 108 may output a voice to an outside of the vehicle 100 and may be referred to as an external speaker.

The communicator 110 may support establishing of wired and/or wireless communication channels between the vehicle 100 and an external device, for example, between the server 150 and the electronic device 170 and performing communication through the established communication channel, and may include a communication circuit. For example, the communicator 110 may include a wireless communication module (for example, a cellular communication module, a Wi-Fi communication module, a short-range wireless communication module, and/or a Bluetooth communication module) and/or a wired communication module, and may communicate with the external device using a corresponding communication module among communication modules.

The communicator 110 may include a controller area network (CAN) communication circuit (also referred to as a CAN transceiver) that communicates with at least one component of the vehicle 100 (the black box device 102, the camera 106, the speaker 108, the storage 116, and/or the controller 118), that is, receives and transmits signals via a vehicle communication network, and a control circuit (also referred to as a control device) for controlling an operation of the CAN communication circuit.

The communicator 110 may include an ultra-wide band (UWB) wireless communication module 112 (also referred to as the UWB module) and a global positioning system (GPS) module 114.

The UWB wireless communication module 112 (also referred to as an UWB wireless communicator or an UWB wireless communication circuit) may receive a signal (also referred to as a UWB signal) reflected from an object. The UWB signal may be used by the controller 118 to identify whether the object (and/or the person) is in a direction of the reflected signal, and to identify whether the object (and/or the person) is moving.

The GPS module 114 (also referred to as a GPS device or a GPS circuit) receives signals transmitted from GPS satellites so that the controller 118 may identify a current location of the vehicle 100.

The storage 116 may store data from a variety of sources, such as input data or output data for a software program and commands related thereto, used by at least one component (the black box device 102, the camera 106, the speaker 108, the communicator 110, and/or the controller 118) of the vehicle 100. The storage 116 may include a memory, for example, a volatile memory and/or a non-volatile memory.

The controller 118 (also referred to as a control circuit, or a processor) may control at least one of other components (for example, hardware components (the black box device 102, the camera 106, the speaker 108, the communicator 110, and/or the storage 116) or software components (software programs)) of the vehicle 100, and may perform processing and operations on a variety of data. The controller 118 may include an electronic control unit (ECU) that controls a powertrain of the vehicle 100. The controller 118 may include a processor and a memory.

The controller 118, based on image processing of the images acquired through the camera 104 and/or the camera 106 and an input of a signal through the network in the vehicle 100 and/or self-determination, may control generation of an output of a signal in the vehicle 100.

The controller 118 may control the speaker 108 to output an amplified voice or sound based on the input of the signal.

The controller 118 may acquire the surrounding images of the vehicle 100 through the camera 104 and/or the camera 106, and identify the person with criminal intent (or might be referred to as a suspicious person) in a vicinity of the vehicle 100 based on an analysis of the acquired images.

The person with criminal intent may be the person likely to occur a security-related dangerous situation of the vehicle 100. For example, the person with criminal intent is the person who is predicted to commit a criminal action (behavior such as damaging a vehicle, stealing a vehicle and/or stealing items from a vehicle) targeting the vehicle 100 (also referred to as the person engaging in suspicious behavior).

The controller 118, based on identification of whether there is the person with criminal intent in the vicinity of the vehicle 100, may identify that the security-related dangerous situation of the vehicle 100 is likely to occur in the vehicle 100.

For example, the controller 118 may monitor around the vehicle 100 based on the image acquired through the camera 104. The controller 118, when the person with criminal intent is identified during monitoring around the vehicle 100, may further turn on the camera 106. The controller 118 may monitor around the vehicle 100 based on the images acquired through the cameras 104 and 106 to identify a possibility of occurrence of the security-related dangerous situation of the vehicle 100.

For example, when the behavior of the person with criminal intent is monitored during monitoring around the vehicle 100, the controller 118 turns on all cameras installed in the vehicle 100 and monitors around the vehicle 100, so that the possibility of occurrence of the security-related dangerous situation of the vehicle 100 may be identified.

For example, the controller 118 may identify the person with criminal intent based on a preset algorithm.

The preset algorithm may be a conventional algorithm capable of identifying the person with criminal intent through an image. For example, the preset algorithm may be an algorithm applied to a conventional lie detection system or an algorithm applied to a suspect screening system. For example, the preset algorithm may be a Vibraimage analysis algorithm.

The basic principle of the Vibraimage analysis algorithm is as follows.

Generally, a human brain and vestibular organs of a human body perform various roles such as, postural control, self-movement, cognitive ability, spatial movement, and/or object cognitive functions, by regulating the body's balance organs through a vestibular cortex of the brain. A heart of human and body's autonomic nerves transmit information from the heart to the brain, such as heart rate, tension (and/or anxiety), and/or arousal (and/or relaxation). At this time, by stimulating the vestibular organs through rotational stimulation and/or temperature stimulation using blood flow, the influence on the human body may be grasped. Brain's command and the heart's response are expressed as a balance or a minute tremor through the balance organs and the vestibular organs, and appear as minute vibrations. Technologies for recognizing these human physiological responses have been applied to the Vibraimage analysis algorithm. The Vibraimage analysis algorithm may recognize the physiological responses of the person based on the analysis of image data using a camera. For example, through the analysis of an image captured by the camera, the person's emotional state may be analyzed based on minute vibrations of the person's bioenergy included in the image.

The Vibraimage analysis algorithm using above-described basic principle may predict whether the person included in the image is in a normal or aggressive state, and based on this, may identify whether the person included in the image is the person with criminal intent.

For example, the controller 118, when the analysis result of the Vibraimage acquired through the camera 104 exceeds a predetermined criterion is derived, may identify that there is the person with criminal intent.

For example, the possibility of occurrence of the security-related dangerous situation is determined based on the analysis result of the Vibraimage acquired through the camera 104 as well as the camera 106, by identifying a previously identified person with criminal intent once again whether the person has criminal intent.

In another exemplary embodiments, the probability of occurrence of the security-related dangerous situation may be determined by identifying a motion of the person with criminal intent through image analysis. For example, the possibility of occurrence of the security-related dangerous situation may include in response to the person with criminal intent being located in the vicinity of the vehicle 100 for more than a preset time, in response to the person with criminal intent being located within a preset distance from the vehicle 100, in response to the person touching at least a part of the vehicle 100, in response to the person trying to open a door of the vehicle 100, in response to the person throwing a destructible object towards the vehicle 100, in response to the person opening the door of the vehicle 100, in response to the person entering the interior of the vehicle 100, and/or in response to the person damaging to the vehicle.

The controller 118 may transmit information notifying the possibility of occurrence of the security-related dangerous situation of the vehicle 100 to the electronic device 170 through the communicator 110 based on the identified possibility of occurrence of the dangerous situation.

The information on the possibility of occurrence of the security-related dangerous situation of the vehicle 100 may include alarm information and/or at least a part of an image (also referred to as a suspicious image). For example, the controller 118 may transmit the at least a part of the image to the electronic device 170 and/or the server 150 in a streaming manner.

For example, when the vehicle 100 and the electronic device 170 are spaced apart from each other by a distance greater than or equal to a predetermined distance (also referred to as a long-range case), the controller 118 may transmit the information on the possibility of occurrence of the security-related dangerous situation of the vehicle 100 to the electronic device 170 through the server 150. The controller 118 may transmit information on the possibility of occurrence of the security-related dangerous situation of the vehicle 100 to the server 150 through the communicator 110, and the server 150 receiving the information may transmit the information on the possibility of occurrence of the security-related dangerous situation of the vehicle 100 to the electronic device 170. Therefore, a user of the electronic device 170 may identify the dangerous situation of the vehicle 100.

The controller 118 may perform a determination of the person having criminal intent and/or the possibility of occurrence of the security-related dangerous situation of the vehicle wo in predetermined dangerous situation steps.

For example, the predetermined dangerous situation steps may include a first step, a second step and/or a third step, and the like.

For example, the first step may be predetermined to include a case in which the person touches at least a part of the vehicle 100. The second step may be predetermined to include in a case in which the person is trying to open the door of the vehicle 100 and/or throws a destructible object towards the vehicle 100. The third step may be predetermined to include in a case in which the person opens the door of the vehicle 100, the person enters the interior of the vehicle 100, and/or the person damages to the vehicle 100, and the like.

When the controller 118 identifies that there is the person with criminal intent in the vicinity of the vehicle 100, the controller 118 may store a related image in the memory (not shown) of the black box device 102 and/or the storage 116.

Thereafter, the controller 118 may identify a dangerous situation step in which a dangerous situation of the vehicle is included among predetermined dangerous situation steps.

The controller 118 may transmit information on the possibility of occurrence of the security-related dangerous situation of the vehicle 100 to the electronic device 170 through the communicator 110 based on the identified dangerous situation step.

For example, when the identified dangerous situation step is a predetermined third step, the controller 118 may output a warning sound through the speaker 108. Simultaneously with such an operation, the controller 118 may transmit information on the possibility of occurrence of the security-related dangerous situation of the vehicle 100 to the electronic device 170.

The electronic device 170 may receive and output the information on the possibility of occurrence of the security-related dangerous situation of the vehicle 100, which is transmitted from the vehicle 100. After identifying this, the user may operate the electronic device 170 to transmit a signal for controlling the vehicle 100 so that the vehicle 100 outputs the warning sound following the identifying. In addition, the controller 118 may transmit an image related to the dangerous situation of the vehicle 100 to the server 150 through the communicator 110.

The server 150 may manage a security of the vehicle 100 For example, the server 150 may provide the vehicle 100 with the same services as vehicle-related services provided by the electronic device 170, which will be described later.

The server 150 may include a communicator 152, a storage 154, and/or a controller 156.

The communicator 152 (also referred to as a communication device or a communication circuit) may support establishing of a wired communication channel between the server 150 and an external device, for example, vehicle 100, the server 160 and the electronic device 170 and performing communication through the established communication channel. For example, the communicator 152 may include a wireless communication module (for example, a cellular communication module, Wi-Fi communication module) and communicate with the external device using a communication network such as a fifth-generation (5G) communication network. The communicator 152 may include a communication circuit.

The storage 154 (also referred to as a storage device) may store data from a variety of sources, such as input data or output data for a software program and commands related thereto, used by at least one component (the communicator 152 and/or the controller 156) of the server 150. The storage 154 may include a volatile memory and/or a non-volatile memory. The storage 154 may include a database.

The controller 156 (also referred to as a control device, a control circuit, or a processor) may control at least one of other components (for example, hardware components (the communicator 152 and/or the storage 154) or software components (software programs)) of the server 150 connected thereto, and may perform processing and operations on a variety of data. The controller 156 may include a processor and a memory.

The controller 156 may manage the security of the vehicle 100 based on communication with the vehicle 100, the electronic device 170, and/or the server 160 through the communicator 152.

The controller 156 may receive information on the possibility of occurrence of the security-related dangerous situation of the vehicle 100 from the vehicle 100 through the communicator 152. The controller 156 may transmit image data included in information received from the vehicle 100 through the communicator 152 to the server 160.

The server 160 may include a server of a public institution, such as a police station and/or a fire station.

Although not shown, the server 160 may include components of the server 150, for example, components corresponding to the communicator 152, the storage 154, and/or the controller 156.

The server 160 may communicate with an external device, for example, the server 150 and/or the electronic device 170 through the communicator.

The electronic device 170 may include a smart key, a smart phone, and/or a smart watch.

The electronic device 170 may include an input module 171, an output module 173, a communication module 175, a storage module 177, and/or a control module 179.

The input module 171 (also referred to as an input device) may include a microphone and/or a keypad.

The microphone may receive a sound, for example, a voice of a user of the electronic device 170, and may convert the received sound into an electrical signal.

The keypad may include a virtual keypad and/or a physical keypad, and may receive input from the user.

The output module 173 (also referred to as an output device) may include a speaker and/or a display.

The speaker may output an electrical signal by converting the electrical sound into a sound.

The display may, for example, display a variety of content (e.g., a text, an image, a video, an icon, and/or a symbol, etc.). The display may include a touch screen, and for example, may receive an input such as a touch, a gesture, a proximity, or a hovering using a part of the user's body.

The communication module 175 (also referred to as a communication device or a communication circuit) may support establishing of a wired communication channel between the electronic device 170 and an external device, for example, vehicle 100, the server 150 and/or the server 160 and performing communication through the established communication channel. For example, the communication module 175 may include a wireless communication module (for example, a cellular communication module, Wi-Fi communication module, and/or a Bluetooth communication module etc.) and communicate with the external device. The communication module 175 may include a communication circuit.

The storage module 177 (also referred to as a storage device or a memory) may store data from a variety of sources, such as input data or output data for a software program and commands related thereto, used by at least one component (the input module 171, the output module 173, the communication module 175, and/or the control module 179) of the electronic device 170. The storage module 177 may include a volatile memory and/or a non-volatile memory.

The storage module 177 may store a digital key for controlling the vehicle 100 such as entry, exit, start, travel and/or function control of the vehicle 100. For example, the storage module 177 may store an application including the digital key for controlling the vehicle 100.

The control module 179 (also referred to as a control device, a control circuit, or a processor) may control at least one of other components (for example, hardware components (the input module 171, the output module 173, the communication module 175, and/or the storage module 177) or software components (software programs)) of the electronic device 170 connected thereto, and may perform processing and operations on a variety of data. The control module 179 may include a processor and a memory.

The control module 179 may communicate with the vehicle 100 through the communication module 175, and may control the vehicle 100 through the digital key stored in the storage module 177 or the application including the digital key.

For example, the control module 179 may receive information on the possibility of occurrence of the dangerous situation of the vehicle 100 from the vehicle 100 and/or the server 150 through the communication module 175. The control module 179 may output information on the possibility of occurrence of the dangerous situation of the vehicle 100 through the output module 173, for example, the speaker and/or the display to allow the user to identify.

The control module 175 may receive a user's voice through the input module 171, for example, the microphone. The control module 175 may transmit a voice signal to the vehicle 100 through the communication module 175 so that the vehicle 100 may output a voice corresponding to the voice signal through the speaker 108.

Meanwhile, in the above-described embodiments, the camera 104 has been described as being included in the black box device 102, but according to another embodiment, the camera 104 may be implemented as a separate component of the vehicle 100 separate from the black box device 102.

Furthermore, in the above-described embodiments, the UWB module 112 and the GPS module 114 have been described as being included in the communication device 110, but according to another embodiment, the UWB module 112 and/or the GPS module 114 may be implemented as a separate component of the vehicle 100 separate from the communication device 110.

Furthermore, although not shown, in addition to the above-described embodiments, the vehicle 100 may include an audio video navigation (AVN) device (not shown). The AVN device may refer to a multimedia device in which an audio, a video, a navigation, and/or a telematics terminal, and the like are integrated into one. The AVN device may be provided on a center fascia of the vehicle 100, but is not limited thereto.

FIG. 2 is a flowchart showing a control operation of the vehicle 100 (and/or the controller 118 of the vehicle 100) according to an exemplary embodiment.

The vehicle 100 may identify an ignition-off state of the vehicle 100 (201).

The vehicle 100 may acquire at least one first image through the first camera 104 of the vehicle 100 based on the ignition-off state of the vehicle 100 (203).

In response to the ignition-off, the vehicle 100 may identify on the possibility of occurrence of the security-related dangerous situation of the vehicle 100, and in this case, may operate in an alert mode of the vehicle 100 including performing at least one operation for security of the vehicle 100.

The vehicle 100 may identify on the possibility of occurrence of the security-related dangerous situation of the vehicle 100 based on the acquired at least one first image (205).

The vehicle 100 may identify the person with a criminal intent in the vicinity of the vehicle 100 based on the at least one first image. In response to identifying on presence of the person with criminal intent in the vicinity of the vehicle 100, the vehicle 100 may identify on the possibility of occurrence the security-related dangerous situation of the vehicle 100.

For example, the first camera 104 may be included in the black box device 102, and the vehicle 100 may monitor the first image acquired through the first camera 104. The vehicle 100 identifies that there is the person with criminal intent in the vicinity of the vehicle 100 through an algorithm stored in the storage 116 during monitoring of the first image acquired through the first camera 104.

For example, the first camera 104 may include a device capable of acquiring the Vibraimage, and the at least one first image may include the Vibraimage. The vehicle 100 may identify whether there is the person with criminal intent in the vicinity of the vehicle 100, in response to the analysis of the Vibraimage through the Vibraimage technology (or the analysis algorithm of the Vibraimage).

The vehicle 100 may turn on the second camera 106 in response to identification of presence of the person with criminal intent in the vicinity of vehicle 100 The vehicle 100 may identify the possibility of occurrence of the security-related dangerous situation of the vehicle 100 further based on the at least one second image acquired through the second camera 106.

For example, the second camera 106 may be all cameras in the vehicle 100 or included in the SVM system, and by turning on the second camera 106, the alert mode of the vehicle 100 in the security-related dangerous situation of the vehicle 100 may strengthen.

Vehicle 100 may turn on the UWB module 112 in response to identification of presence of the person with criminal intent in the vicinity of vehicle 100. The vehicle 100 may identify the possibility of occurrence of the security-related dangerous situation of the vehicle 100 further based on the signal received through the UWB module 112.

For example, the vehicle 100 may be more precisely monitored the possibility of occurrence of the security-related dangerous situation of the vehicle 100 by operating the UWB module 112 and identifying obstacles around the vehicle 100, that is, the person with criminal intent, together with the first image acquired through the first camera 104 and/or the second image acquired through the second camera 106.

In response to the identification of the possibility of occurrence of the security-related dangerous situation of the vehicle 100, the vehicle 100 may transmit information on the possibility of the occurrence of the security-related dangerous situation of the vehicle to the at least one external device (207).

The at least one external device may include the electronic device 17 including the digital key for controlling the vehicle and/or the server 150 for managing security of the vehicle 100.

In addition to the above-described embodiments, the vehicle 100 may receive a control signal from the at least one external device in response to the transmission of information regarding the possibility of the occurrence of the possibility of the occurrence of the security-related dangerous situation of the vehicle to the at least one external device. The vehicle 100 may output warning voice data (also referred to as warning sound data) through the speaker 108 based on the control signal received from the at least one external device. For example, the speaker 108 of the vehicle 100 may amplify and output the warning voice data.

For example, the vehicle 100 may receive user's warning voice data from the electronic device 170, and may output the received warning voice data through the speaker 108. For example, the received warning voice data may vary, such as "I am a car owner. What's going on? Please get away from the car."

Furthermore, in addition to the above-described embodiments, the vehicle 100 may output a predetermined warning voice data (or a predetermined warning data) in response to the identification of the possibility of occurrence of the security-related dangerous situation of the vehicle 100 through the speaker 108.

For example, the vehicle 100 may output the warning voice data in response to the possibility of occurrence of the dangerous situation stored in the storage 116 through the speaker 108. For example, the warning voice data may be set in various ways, such as "Please get away from the car", "I will record from now." Or "If you do something dangerous, and the police will be automatically connected."

Furthermore, in addition to the above-described embodiments, the vehicle 100 may identify that the possibility of occurrence of the dangerous situation in operation 205 described above has been eliminated through the first camera 104 and/or the second camera 106. For example, the vehicle 100 may identify that there is no person with a criminal intent in the vicinity of the vehicle 100, thereby eliminating the possibility of occurrence of the dangerous situation.

In response to identifying on the elimination of the possibility of occurrence of the dangerous situation, the vehicle 100 turns off the second camera 106 and/or the UWB module 112 turned on in one embodiment above, thereby reducing power consumption of the vehicle 100.

Furthermore, in addition to the above-described embodiments, the vehicle 100 may identify a parking position of the vehicle 100 based on a signal received via the GPS 114 upon parking the vehicle loft. The vehicle 100 may turn on or turn off the second camera 106 at predetermined time interval based on the parking position of the vehicle 100.

For example, the vehicle 100 may identify whether the vehicle 100 is parked based on the surrounding image of the vehicle 100 acquired by the vehicle 100, a location of the vehicle 100, and/or starting off of the vehicle 100, etc.

For example, the vehicle 100 may identify whether a parked location of the vehicle loo is included in a hazardous area based on at least one of hazardous area information received through the communicator 110 and hazardous area information stored in the storage 116 of the vehicle 100.

The vehicle 100 may turn on or turn off the second camera 106 at a predetermined time interval in response to the identifying whether the parked location of the vehicle 100 is included in the hazardous area. For example, the hazardous area information may include information on a place in which the parking location is not permitted or a place located in a crime zone.

For example, in response to identification oft the parked location of the vehicle 100 being included in the hazardous area, the vehicle 100 may output a separate guide announcement and/or a guide voice through the display (not shown) and/or the speaker 108 of the vehicle 100. Furthermore, the vehicle 100 transmits the information that the parked location of the vehicle 100 is included in the hazardous area to the electronic device 170, and the electronic device 170 may output the guide announcement and/or the guide voice through the output module 173. For example, the guide announcement and/or the guide voice may say "Parking here is dangerous." or "Where you're parked is dangerous."

Furthermore, in addition to the above-described embodiments, the vehicle 100 may turn on or turn off the second camera 106 at the predetermined time interval further based on predetermined time information.

Furthermore, the vehicle 100 may further include an illuminance sensor for detecting a lighting position and a change in ambient brightness. In addition, the vehicle may include an automatic light system (not shown) capable of automatically turning on or turning off a tail lamp or a head lamp of the vehicle 100 based on a signal of the illuminance sensor. The vehicle 100 may identify night time (and/or sunrise time) based on the signal from the automatic light system. The vehicle 100 may turn on or turn off the second camera 106 at a predetermined time interval upon identification of the night time.

Therefore, the vehicle 100 may strengthen the alert mode of the vehicle 100 during a time when a crime is highly likely to occur. For example, the vehicle 100 may further enhance the security function of the vehicle 100 by turning on or off the second camera 106 at a predetermined time interval at night time.

Furthermore, in addition to the above-described embodiments, the vehicle 100 may receive a signal for controlling the turning on or off of the second camera 106 from the electronic device 170, and based on this, the vehicle may control the turning on or off of the second camera 106.

For example, the electronic device 170 may transmit a signal for controlling the turning on or off of the second camera 106 corresponding to a situation of the vehicle 100 by a driver, and the vehicle 100 receiving the signal may control the turning on or off of the second camera 106. The signal for controlling the turning on or off of the second camera 106 may include the controlling of the turning on or off of the second camera 106 and/or setting of an operating time of the turning on or off of the second camera 106.

Furthermore, in addition to the above-described embodiments, the vehicle 100 may identify the dangerous situation step in which the dangerous situation of the vehicle 100 in operation 205 is included among the predetermined dangerous situation steps.

The vehicle 100 may transmit information on the possibility of occurrence of the dangerous situation in response to the identified dangerous situation step. In addition, the vehicle 100 may output a predetermined alert signal in response to the identified dangerous situation step through the speaker 108.

FIG. 3 is a flowchart showing operations of a vehicle (and/or the controller 118 of the vehicle 100) and an electronic device (and/or the control module 179 of the electronic device 170) according to an exemplary embodiment.

The vehicle 100 may identify a parking of the vehicle 100 (301).

The vehicle 100 may identify whether the vehicle 100 is parked based on the ignition-off state of the vehicle 100. The vehicle 100 may identify whether the vehicle 100 is temporarily stopped (or parked for a while) or is parked based on a predetermined time. For example, the vehicle 100 may identify that the vehicle 100 is parked when a predetermined time has exceeded after the ignition-off state of the vehicle 100.

The vehicle 100 may turn on the black box device 102 in response to the identification of the vehicle 100 being parked (303).

In response to identification of the parking of the vehicle 100 and/or turning on of the black box device 102, the vehicle 100 may identify whether the vehicle 100 is locked (305).

If the vehicle 100 is locked, operation 307 may be performed, otherwise operation 305 may be performed again.

The vehicle 100 may perform a monitoring function of the surroundings of the vehicle 100 (307).

The vehicle 100 may acquire the image through the camera 104 of the black box device 102 to perform a monitoring function of the surroundings of the vehicle 100.

The vehicle 100 may turn on or turn off the at least one camera of the vehicle 100 based on the control signal of the electronic device 170, and the vehicle 100 acquires the image through the turned-on at least one camera to perform the monitoring function of the surroundings of the vehicle 100.

The vehicle 100 may identify whether there is the person with criminal intent in the vicinity of the vehicle 100 in response to the performance of the monitoring function of the surroundings of the vehicle 100 (309).

If there is the person with criminal intent in the vicinity of the vehicle 100, operation 311 may be performed, otherwise operation 307 may be performed again.

The vehicle 100 may transmit the information on the possibility of occurrence of the security-related dangerous situation of the vehicle 100 to the electronic device 170 (311).

The information on the possibility of occurrence of the security-related dangerous situation of the vehicle 100 may include alarm information and/or at least a part of an image (also referred to as a suspicious image).

The electronic device 170 may identify warning steps based on the reception of information on the possibility of occurrence of the security-related dangerous situation of the vehicle 100 transmitted from the vehicle 100 (313).

For example, the warning steps may include a first step, a second step and/or a third step, and the like. For example, the first step may be a step capable of warning a voice automatically set, the second step may be a step capable of warning a voice received from the user, and the third step may be a step capable of warning a theft alarm.

According to the identification of the warning steps, the electronic device 170 may transmit a control signal corresponding to the identified warning step to the vehicle 100 (315).

The control signal corresponding to the first step includes a control signal for outputting automatically set voice data (also referred to as automatically set sound data) in response to the first step stored in advance in the electronic device 170 or the vehicle 100.

For example, when the identified warning step is the first step, the electronic device 170 may transmit the control signal including warning information on the automatically set voice data stored in advance in the electronic device 170 to the vehicle 100. In another exemplary embodiment, when the identified warning step is the first step, the electronic device 170 may transmits the control signal for outputting the automatically set voice data in response to the first step stored in advance in the vehicle 100 to the vehicle 100.

The control signal corresponding to the second step may include a control signal for outputting the user's voice data of the electronic device 170.

For example, when the identified warning step is the second step, the electronic device 170 may receive the user's voice data through the input module 171, for example, the microphone. The electronic device 170 may transmit the control signal including the user's voice data to the vehicle 100 so that the vehicle 100 outputs the user's voice data through the speaker 108.

The control signal corresponding to the third step may include a control signal for outputting the received voice data from the automatically set voice data in response to the third step stored in advance in the electronic device 170 and/or the vehicle 100, the user's voice data, and/or voice data received from the communication-connected server 150.

For example, when the identified warning step is the third step, the electronic device 170 may receive the user's voice data through the input module 171, for example, the microphone. The electronic device 170 may transmit the control signal including the user's voice data to the vehicle 100 so that the vehicle 100 outputs the user's voice data through the speaker 108.

Furthermore, for example, the electronic device 170 may transmit information that the identified warning step of the vehicle 100 is the third step to the server 150, and receives the voice data from the server 150 to transmit the vehicle 100 For example, when the server 150 receives the information that the identified warning step of the vehicle 100 transmitted by the electronic device 170 is the third step, the server 150 may transmit the information received to the server 160. The server 150 may also transmit the location information of the vehicle 100 to the server 160 when the information that the identified warning step of the vehicle 100 is the third step is transmitted. For example, the server 160 may be a server of a public institution such as a police station and/or a fire station, and according to the location information of the vehicle 100, the server 150 allows a police car and/or an ambulance, etc. to dispatch to a place where the vehicle 100 is located.

The vehicle 100 may perform an operation based on the control signal in response to receiving a control signal corresponding to the identified warning step transmitted by the electronic device 170 (317).

The vehicle 100 may identify whether the person with criminal intent is not identified (319).

If the person with criminal intent is not identified, the vehicle may end the operation of the embodiment of the present disclosure, otherwise operation 307 may be performed.

On the other hands, in addition to the above-described embodiments, the vehicle 100, without immediately performing operation 311, turns on the camera 106 of the SVM system and the UWB to further identify whether the vehicle 100 is in the security-related dangerous situation when the person with criminal intent in operation 309 described above is identified. When it is identified that the vehicle 100 is in the security-related dangerous situation, the vehicle 100 may perform the above-described operation 311.

Furthermore, in the above-described embodiments, it has been described that the vehicle 100 transmits the information on the possibility of occurrence of the security-related dangerous situation of the vehicle 100 to the electronic device 170 so that the electronic device 170 identifies the warning step. However, in another embodiments, after identifying the warning step, the vehicle 100 may transmit the information on the possibility of occurrence of the security-related dangerous situation of the vehicle 100 further included warning step information to the electronic device 170, and the electronic device 170 may output the warning step information for the user to identify.

FIG. 4 is a view illustrating a vehicle control operation of the electronic device 170 according to an exemplary embodiment.

The electronic device 170 remotely controls the turning on and/or off of the at least one camera of the vehicle 100, for example, the first camera 104 and/or the second camera 106, thereby monitoring the surroundings of the vehicle 100.

Figure 4A:
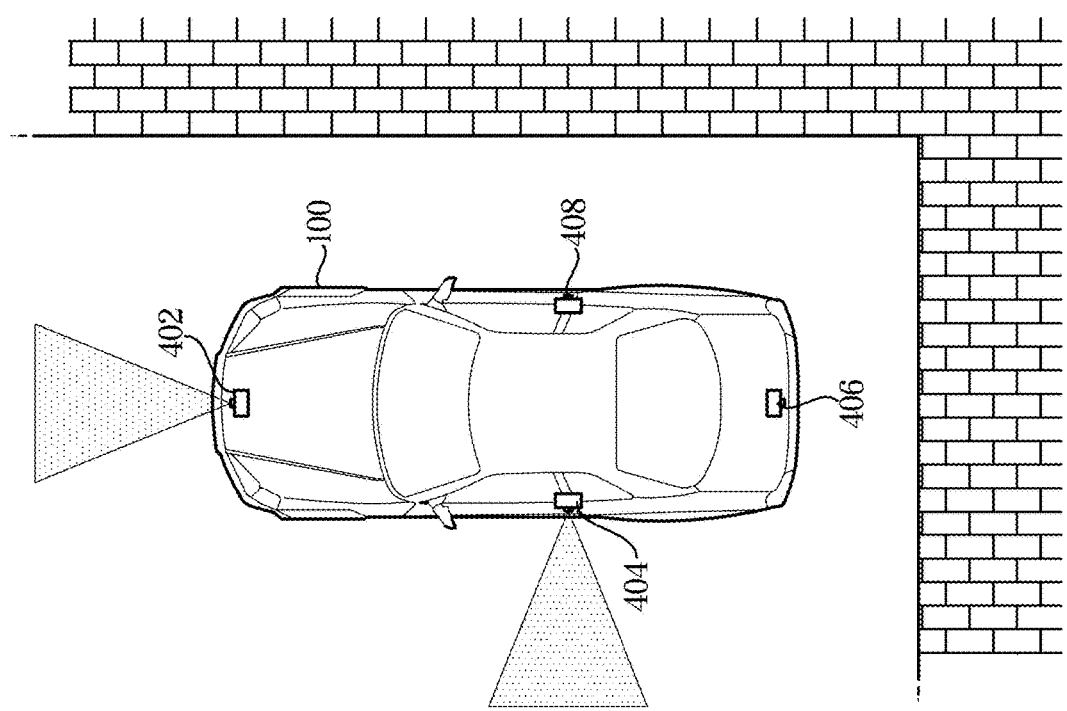
FIG. 4A is a view illustrating a vehicle control operation of an electronic device according to an exemplary embodiment.

For example, the electronic device 170 may, through the output module 173 such as the display, output a menu for controlling the turning on and/or off of the at least one camera of the vehicle 100, for example, the first camera 104 and/or the second camera 106. The electronic device 170 may turn on some cameras of the vehicle 100 and turn off some cameras as shown in FIG. 4A based on the user input. Referring to FIG. 4A, the vehicle 100 may turn off the camera 406 located on a rear side and the camera 408 located on one side facing a wall, and turn on the cameras 402 and 404 located on the other sides.

In another exemplary embodiment, the electronic device 170 may automatically turn on some cameras of the vehicle 100 and turn off some cameras as shown in FIG. 4A. The electronic device 170 may receive information regarding the cameras 406 and 408 located on one side facing the wall and the rear side of the vehicle 100 from the vehicle 100, and based on this, the vehicle 100 may turn off the camera 406 located on the rear side and the camera 408 located on one side facing the wall, and turn on the cameras 402 and 404 located on the other sides.

Figure 4B:
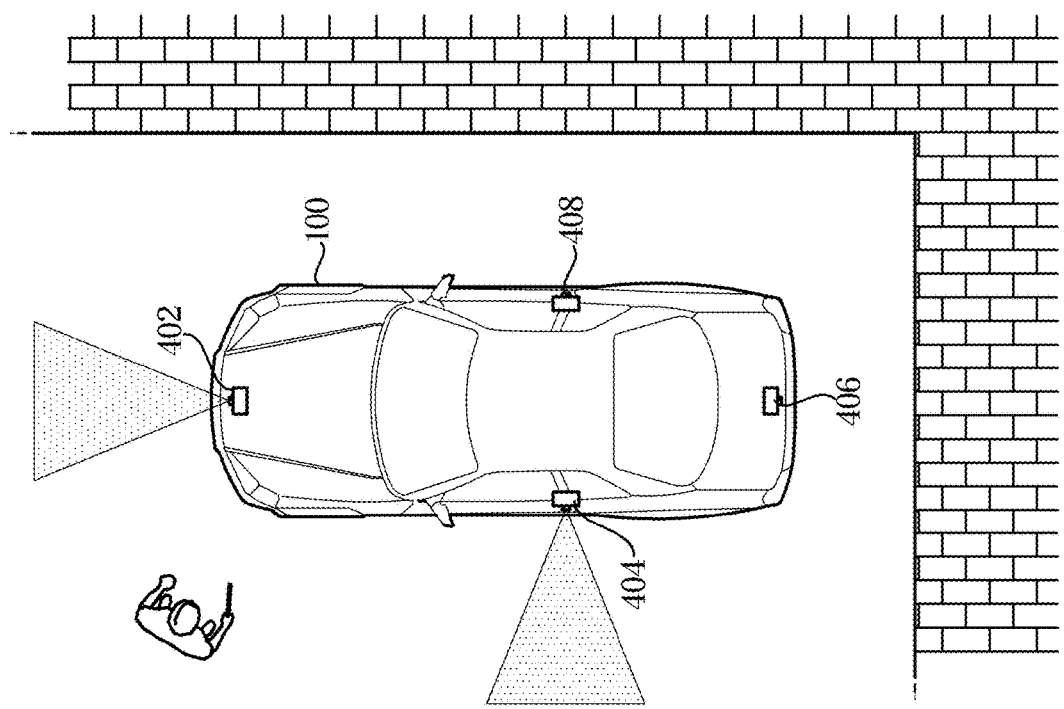
FIG. 4B is a view illustrating a vehicle control operation of an electronic device in the presence of a person with criminal-intent according to an exemplary embodiment.

The electronic device 100 may receive, from the vehicle 100, the information on the possibility of occurrence of the security-related dangerous situation of the vehicle 100 based on the presence of the person with criminal intent. For example, when the person with criminal intent appears around the vehicle 100 as shown in FIG. 4B, the vehicle 100 may acquire an image including the person with criminal intent through the turned on cameras 402 and 404 turned on, and transmit the information on the possibility of occurrence of the security-related dangerous situation of the vehicle 100. The electronic device 100 may receive the information on the possibility of occurrence of the security-related dangerous situation of the vehicle 100, and may output corresponding alarm information through the output module 173.

The electronic device 170 may store in advance the warning voice in response to each warning step. The electronic device 170 transmits the control signal including the warning voice of a corresponding warning step to the vehicle 100 based on the information on the possibility of occurrence of the security-related dangerous situation of the vehicle 100 received from the vehicle 100.

For example, according to the warning step, the electronic device 170 may transmit the control signal including voice data such as "Please get away from the car. You may get hurt" to the vehicle 100.

The electronic device 170 may receive the user's voice through the input module 171 and transmit the voice data in response to the user's voice to the vehicle 100 so that the vehicle 100 outputs the voice warning. Additionally, the vehicle 100 may receive a voice of a nearby person with criminal intent through the microphone (not shown) of the vehicle 100. Accordingly, the user of the electronic device 170 and the person with criminal intent in the vicinity of the vehicle 100 may communicate with each other.

For example, when the user speaks such as "What are you doing?" the electronic device 170 may transmit the control signal including the voice data corresponding to the voice to the vehicle 100.

FIG. 5 is a flowchart showing operations of the vehicle 100 (and/or the controller 118 of the vehicle 100) and the server 150 (and/or the controller 156 of the server iso) according to an exemplary embodiment.

The vehicle 100 may identify the parking of the vehicle 100 (501).

The vehicle 100 may turn on the black box device 102 in response to the identification of the parking of the vehicle 100 (503).

The vehicle 100 may identify whether the vehicle 100 is locked in response to the identification of the parking of the vehicle 100 and/or the turning on the black box device 102 (505).

If the vehicle 100 is locked, operation 507 may be performed, otherwise operation 505 may be performed again.

The vehicle 100 may perform the monitoring function of the surroundings of the vehicle 100 (507).

The vehicle 100 may acquire the image through the camera 104 of the black box device 102 to perform the monitoring function of the surroundings of the vehicle 100.

The vehicle 100 may turn on or turn off the at least one camera of the vehicle 100 based on the control signal of the electronic device 170, and the vehicle 100 may acquire the image through the turned on at least one camera to perform the monitoring function of the surroundings of the vehicle 100.

The vehicle 100 may identify whether there is the person with criminal intent in the vicinity of the vehicle 100 in response to the performing of the monitoring function of the surroundings of the vehicle 100 (509).

If there is the person with criminal intent in the vicinity of the vehicle 100, operation 511 may be performed, otherwise operation 507 may be performed again.

The vehicle 100 may transmit the information on the possibility of occurrence of the security-related dangerous situation of the vehicle 100 to the server 150 (511).

The server 150 may identify the warning step based on the reception of the information on the possibility of occurrence of the security-related dangerous situation of the vehicle 100 transmitted from the vehicle 100 (513).

In response to the identification of the warning step, the server 150 may transmit the control signal corresponding to the identified warning step to the vehicle 100 (515).

Since the warning steps identified by the server 150 and the corresponding control signal for each warning step correspond to the warning steps identified by the electronic device 170 and the corresponding control signal for each warning step in FIG. 3, description of detailed embodiments will be omitted.

The vehicle 100 may perform the operation based on the control signal in response to the reception of the control signal corresponding to the identified warning step transmitted by the server 150 (517).

The vehicle 100 may identify whether the person with criminal intent is not identified (519).

If the person with criminal intent is not identified, the vehicle may end the operation of the embodiment of the present disclosure, otherwise operation 507 may be performed.

On the other hand, in addition to the above-described embodiments, the vehicle 100, without immediately perform operation 511, turns on the camera 106 of the SVM system and the UWB to further identify whether the vehicle 100 is in the security-related dangerous situation when the person with criminal intent in operation 509 described above is identified. When it is identified that the vehicle 100 is in the security-related dangerous situation, the vehicle 100 may perform the above-described operation 511.

Furthermore, in the above-described embodiments, it has been described that the vehicle 100 transmits the information on the possibility of occurrence of the security-related dangerous situation of the vehicle 100 to the server 150 so that the server 150 identifies the warning step. However, in another embodiments, after identifying the warning step, the vehicle 100 may transmit the information on the possibility of occurrence of the security-related dangerous situation of the vehicle 100 further included the warning step information to the server 150, and the server 150 may output the warning step information for the user to identify.

Furthermore, in the above-described embodiments, the server 150 is directly connected to the vehicle 100 to transmit and receive information, but according to another embodiment, the server 150 and the vehicle 100 may transmit and receive the information each other through the electronic device 170.

For example, the vehicle 100 may transmit the information on the possibility of occurrence of the security-related dangerous situation of the vehicle 100 to the electronic device 170 instead of the above-described operation 511, and the electronic device 170 may transmit the information to the server 150. Furthermore, the server 150 may transmit the identified control signal corresponding to the warning step to the electronic device 170 instead of the above-described operation 515, and the electronic device 170 may transmit the control signal to the vehicle 100.

Furthermore, in addition to the above-described embodiments, the server 150 may store, received from the vehicle 100, the image included in the information on the possibility of occurrence of the security-related dangerous situation of the vehicle 100. For example, the vehicle 100 may transmit the location information of the vehicle 100 together when the vehicle loo transmits the information on the possibility of occurrence of the security-related dangerous situation. Accordingly, the server 150 may store together the location information and the image included in the information on the possibility of occurrence of the security-related dangerous situation. For example, the server 150 may selectively store the images according to a storage capacity of the storage 154 of the server 150. Furthermore, if necessary, the server 150 may separately store a main image.

Furthermore, in addition to the above-described embodiments, the server 150 may identify that the warning steps of the vehicle is a high-risk level, such as the third step that may give the theft alarm warning, and in this case, transmit the corresponding information to the server 170. For example, the server 150 may anonymize the image corresponding to the high-risk level and transmit to the server 160. For example, the server 150, based on the information on the possibility of occurrence of the security-related dangerous situation of the vehicle 100 received from the vehicle 100, may identify that police investigation is required according to the occurrence of a crime against the vehicle 100. For example, the server 160 may be a server of the police station, and when it is identified that the police investigation is required according to the occurrence of the crime against the vehicle 100, the server 150 may transmit only important images included in the selectively received information to the server 160.

The server 150 may anonymize and store the location and the image of the vehicle 100, and transmit to the server 160, and the surrounding image based on the location of the vehicle 100 may be investigated by the police station.

In the above-described embodiments, the vehicle 100 may monitor the surroundings of the vehicle 100 through the cameras (e.g., the camera 104 and/or the camera 106) of the vehicle 100. At this time, current consumption of the vehicle 100 may be minimized.

For example, after parking the vehicle 100, when the vehicle is locked (also referred to as a case of setting a default alert mode), the vehicle 100 may identify whether the person with criminal intent appears by scanning the surrounding image of the vehicle 100 through the camera 104 of the black box device 102 (e.g., front and rear cameras of the vehicle 100). The black box device 102 may be operated by applying a separate battery. When it is identified the presence of the person with criminal intent in the vicinity of the vehicle 100, the vehicle 100 may operate the camera 106 of the SVM system (e.g., the cameras located on a left direction and a right direction of the vehicle 100).

Accordingly, the vehicle 100 may monitor a front, a rear, the left, and the right directions in real-time.

Furthermore, the vehicle 100, when it is identified that the presence of the person with criminal intent in the vicinity of the vehicle 100, may operate the UWB module 112 and identify surrounding objects (obstacles, people, etc.) along with images acquired through the cameras, thereby precisely monitoring the security-related dangerous situation of the vehicle 100.

The vehicle 100, when the dangerous situation disappears upon monitoring the surroundings of the vehicle 100, terminates the operations of the camera 106 of the SVM system and the UWB module 112, and may monitor the front and the rear directions of the vehicle 100 through the camera 104 of the black box device 102.

Therefore, when the possibility of occurrence of the dangerous situation in the vehicle 100 is high, vehicle protection may be strengthened through an intensive monitoring of the vehicle 100, and when the possibility of occurrence of the dangerous situation is low, battery consumption of the vehicle 100 may be minimized.

Furthermore, for example, after parking the vehicle 100, when the vehicle is locked (also referred to as the case of setting the default alert mode), the vehicle 100 may identify the parking location based on the signal received through the GPS module 114 of the vehicle 100. If the parking location of the vehicle 100 is determined to be the dangerous area or a new location other than a usual parking location, the cameras 106 (e.g., the cameras located on the left direction and the right direction of the vehicle 100) of the SVM system in addition to the cameras 104 of the black box device 102 (e.g., the cameras located on the front direction and the rear direction of the vehicle 100) periodically may be operated to monitor the surroundings of the vehicle 100.

Furthermore, in the above-described embodiments, the user of the vehicle 100, for example, the driver may intentionally control the turn on or turn off of the cameras 104 and 106 of the vehicle 100 through the electronic device 170, and may further control other operations of the vehicle 100

As is apparent from the above, the embodiments of present disclosure can enhance the vehicle's security function by utilizing a conventional vehicle black box (and/or a built-in cam) and the digital key system.

Furthermore, the embodiments of present disclosure can reduce anxiety that a vehicle owner may have theft of the vehicle, the theft of objects in the vehicle, and/or damage to the vehicle.

For example, the embodiments of present disclosure can recognize that the vehicle is in the security-related dangerous situation of the vehicle when criminals targeting the vehicle perform actions such as looking around the vehicle while looking inside the vehicle, and preemptively respond to dangerous situations by outputting the alarm or the warning voice.

For example, the embodiments of present disclosure can enhance the security function of the vehicle, so that the anxiety about the security problem of the vehicle can be reduced when the user of the vehicle moves after parking the vehicle on a roadside, at any place and/or in an outdoor parking lot.

For example, the embodiments of present disclosure have a long-term recording function and transmit the acquired image to the server and store the image in the server, thereby reducing the capacity problem of the vehicle's storage medium device and/or solving the problem of not being able to check the video due to a malfunction, etc.

For example, the embodiments of present disclosure can provide the user of the vehicle with information on whether the area where the vehicle is parked is the hazardous area or not based on the parking position of the vehicle. In another exemplary embodiments, the vehicle and control method thereof of the present disclosure can receive information about the hazardous area from the server that stores information about the hazardous area (list information), when necessary, based on the parking position of the vehicle, and provide to the user of the vehicle. Accordingly, even when the user of the vehicle parks the vehicle in an unfamiliar area and it is not determined whether the area where the vehicle is parked is the hazardous area, the user of the vehicle can safely park the vehicle.

For example, the embodiments of present disclosure, when a problem such as a crime and/or an accident occurs in a parked vehicle, can transmit the related images to the server of an external related organization, for example, the server of the police station to provide assistance in identifying the cause of the problem and resolving the problem.

On the other hand, the above-described embodiments may be implemented in the form of a recording medium storing commands executable by a computer. The commands may be stored in the form of program code. When the commands are executed by a processor, a program module is generated by the commands so that the operations of the disclosed embodiments may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although embodiments of the present disclosure have been shown and described, it would be appreciated by those having ordinary skill in the art that changes may be made in these embodiments without departing from the principles and spirit of the disclosure, the scope of which is defined in the claims and their equivalents.

What is claimed is:

1. A vehicle, comprising:
   at least one first camera;
   at least one second camera;
   a communicator; and
   a controller connected to the at least one first camera, the at least one second camera, and the communicator;
   wherein the controller is configured to:
      identify an ignition-off state of the vehicle;
      acquire at least one first image through the at least one first camera based on the ignition-off state of the vehicle;
      identify a presence of a person with criminal intent in a vicinity of the vehicle based on the at least one first image;
      turn on the at least one second camera in response to identifying the presence of the person with criminal intent in the vicinity of the vehicle;
      identify a possibility of occurrence of a security-related dangerous situation of the vehicle based on the acquired at least one first image and at least one second image acquired through the at least one second camera;
      in response to the identifying on the possibility of occurrence of the security-related dangerous situation of the vehicle, transmit information on the possibility of occurrence of the security-related dangerous situation of the vehicle to at least one external device through the communicator;
      identify eliminating of the possibility of occurrence of the dangerous situation through the at least one first camera and the at least one second camera; and
      in response to identifying the eliminating of the possibility of occurrence of the dangerous situation, turn off the at least one second camera to reduce power consumption of the vehicle.

2. The vehicle of claim 1, wherein the at least one first image includes a Vibraimage, and the controller is configured to in response to an analysis of the Vibraimage based on a Vibraimage technology, identify the presence of the person with the criminal intent in the vicinity of the vehicle.

3. The vehicle of claim 2, further comprising an ultra-wide band (UWB) wireless communication module, wherein the controller is configured to:
   turn on the UWB wireless communication module in response to identifying the presence of the person with the criminal intent in the vicinity of the vehicle; and
   identify the possibility of occurrence of the security-related dangerous situation of the vehicle based on a signal received via the UWB wireless communication module.

4. The vehicle of claim 3, wherein the controller is configured to:
   in response to identifying the eliminating of the possibility of occurrence of the dangerous situation, turn off the UWB wireless communication module.

5. The vehicle of claim 1, further comprising a global positioning system (GPS) module, wherein the controller is configured to:
   when the vehicle is parked, identify a parking position of the vehicle based on a signal received through the GPS module; and
   turn on or turn off the at least one second camera at a predetermined time interval based on the parking position of the vehicle.

6. The vehicle of claim 5, further comprising a memory, wherein the controller is configured to:
   identify whether a parked location of the vehicle is included in a hazardous area based
   on at least one of hazardous area information received through the communicator and hazardous area information stored in the memory; and
   in response to the identifying whether the parked location of the vehicle is included in the hazardous area, turn on or turn off the at least one second camera at the predetermined time interval.

7. The vehicle of claim 5, wherein the controller is configured to turn on or turn off the at least one second camera at the predetermined time interval further based on predetermined time information.

8. The vehicle of claim 1, wherein the controller is configured to:
   receive a signal for controlling the turn on or turn off of the at least one second camera through the communicator; and control the turn on or turn off of the at least one second camera based on the signal for controlling the turn on or turn off of the at least one second camera.

9. The vehicle of claim 1, wherein the controller is configured to:
identify a dangerous situation step in which a dangerous situation of the vehicle is included among predetermined dangerous situation steps; and
transmit the information on the possibility of occurrence of the dangerous situation in response to the identified dangerous situation step.

10. The vehicle of claim 9, further comprising a speaker, wherein the controller is configured to output predetermined warning data in response to the identified dangerous situation step through the speaker.

11. The vehicle of claim 1, further comprising a speaker, wherein the controller is configured to output warning data through the speaker based on information received from the at least one external device through the communicator.

12. The vehicle of claim 11, wherein the at least one external device includes at least one of a digital key for controlling the vehicle and a server for managing security of the vehicle.

13. A method of controlling a vehicle, comprising:
identifying, by a controller, an ignition-off state of the vehicle;
acquiring, by the controller, at least one first image through at least one first camera based on the ignition-off state of the vehicle;
identifying a presence of a person with criminal intent in a vicinity of the vehicle based on the at least one first image;
turn on at least one second camera in response to identifying the presence of the person with criminal intent in the vicinity of the vehicle;
identifying, by the controller, a possibility of occurrence of a security-related dangerous situation of the vehicle based on the acquired at least one first image and at least one second image acquired through the at least one second camera;
transmitting, by the controller, information on the possibility of occurrence of the security-related dangerous situation of the vehicle to at least one external device in response to the identifying on the possibility of occurrence of the security-related dangerous situation of the vehicle;
identifying eliminating of the possibility of occurrence of the dangerous situation through the at least one first camera and the at least one second camera; and
in response to identifying the eliminating of the possibility of occurrence of the dangerous situation, turning off the at least one second camera to reduce power consumption of the vehicle.

14. The method of claim 13, wherein:
the identifying on the possibility of occurrence of the security-related dangerous situation of the vehicle further include turning on an ultra-wide band (UWB) wireless communication module in response to identifying the presence of the person with the criminal intent in the vicinity of the vehicle; and
identifying, by the controller, the possibility of occurrence of the security-related dangerous situation of the vehicle based on a signal received via the UWB wireless communication module.

15. The method of claim 14, further comprising:
turning off, by the controller, the UWB wireless communication module in response to identifying the eliminating of the possibility of occurrence of the dangerous situation.

16. The method of claim 13, further comprising:
identifying, by the controller, a parking position of the vehicle based on a signal received through a global positioning system (GPS) module when the vehicle is parked; and
turning on or turning off, by the controller, the at least one second camera at a predetermined time interval based on the parking position of the vehicle.

* * * * *